T. M. FULBRIGHT.
BEET HARVESTER.
APPLICATION FILED JULY 5, 1916.
1,231,593.
Patented July 3, 1917.
3 SHEETS—SHEET 1.
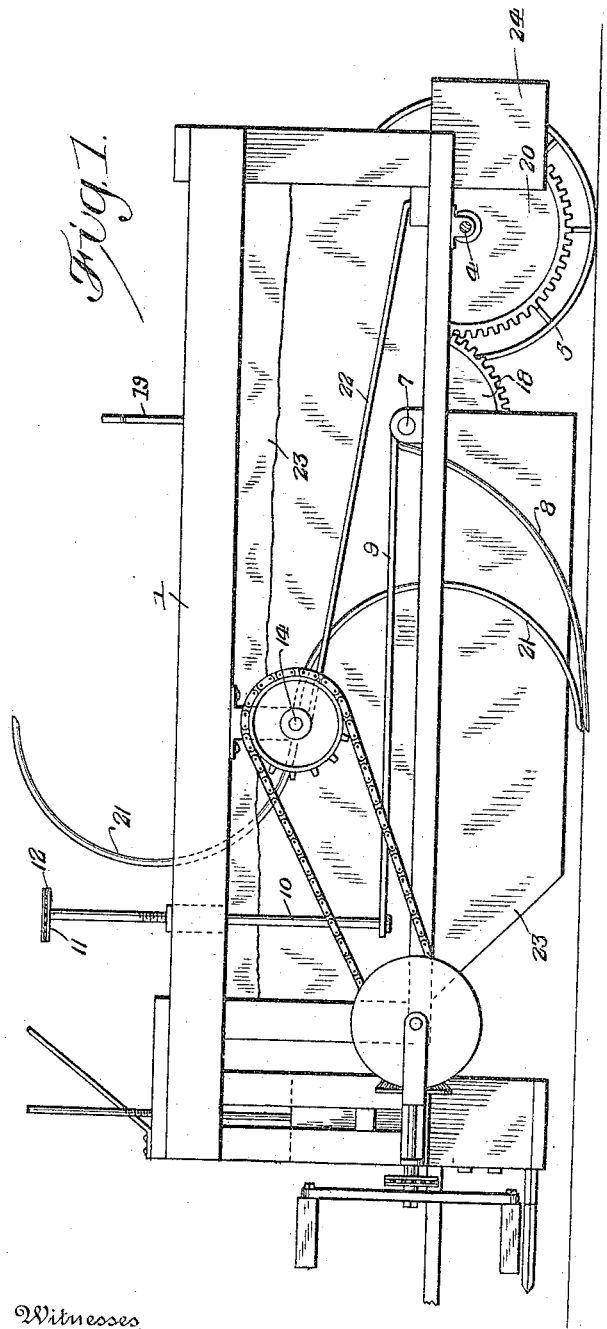
Witnesses
J H Crawford
L. Wilcox
Inventor
T. M. Fulbright,
By Victor J. Evans
Attorney

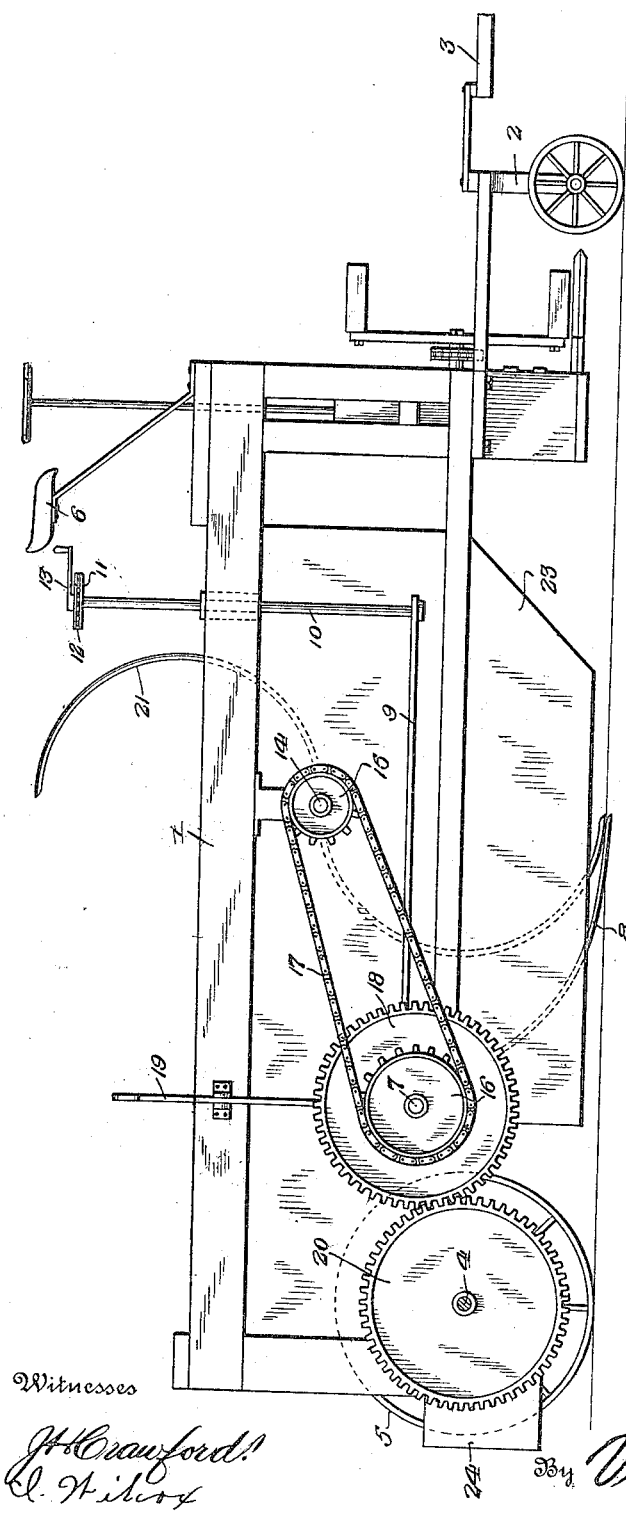

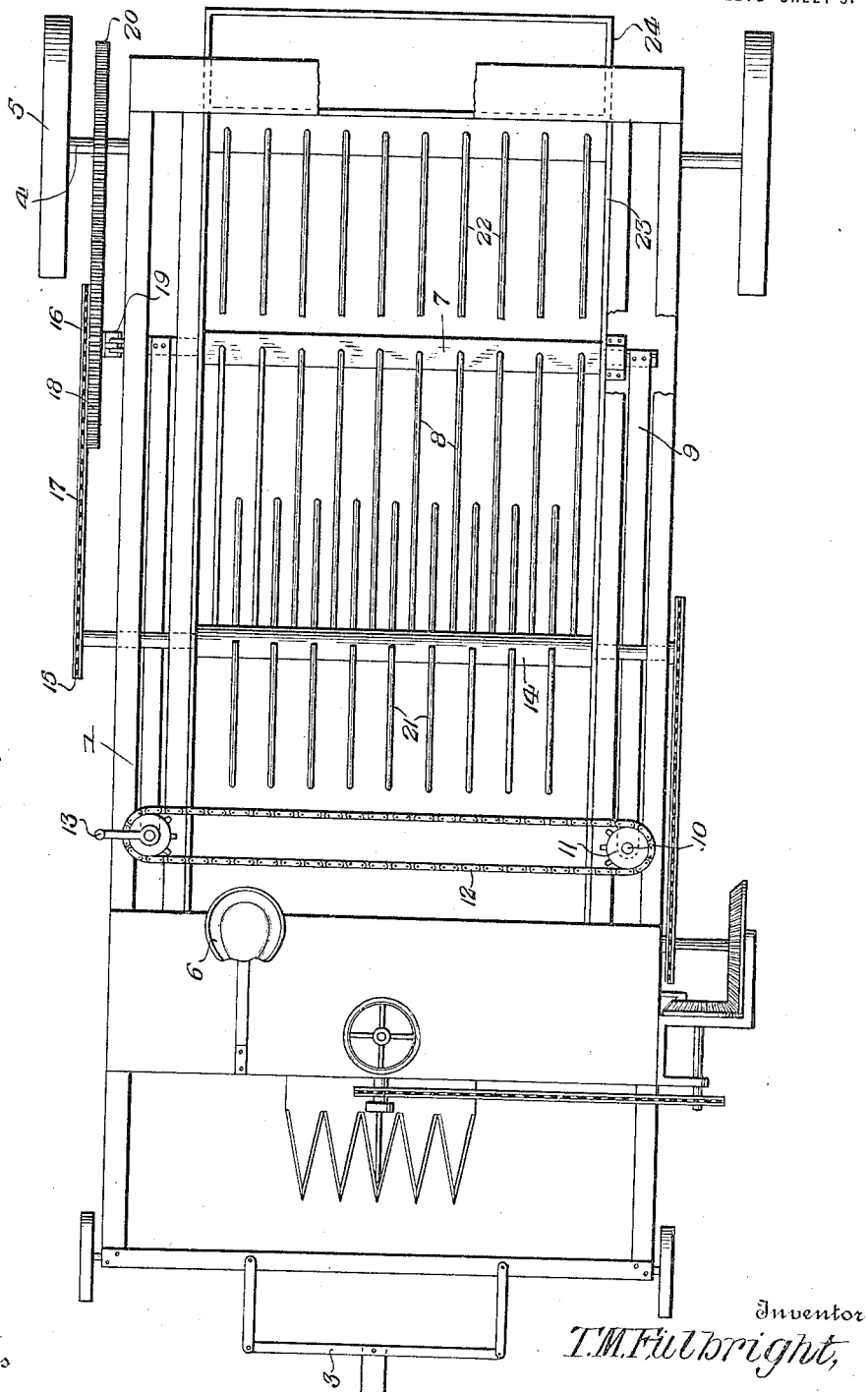

UNITED STATES PATENT OFFICE.

THOMAS M. FULBRIGHT, OF ST. LOUIS, MISSOURI, ASSIGNOR OF ONE-HALF TO PETER J. PATZEN AND ONE-FOURTH TO PATRICK J. ROHAN, BOTH OF ST. LOUIS, MISSOURI.

BEET-HARVESTER.

1,231,593.

Specification of Letters Patent.

Patented July 3, 1917.

Application filed July 5, 1916. Serial No. 107,659.

*To all whom it may concern:*

Be it known that I, THOMAS M. FULBRIGHT, a citizen of the United States, residing at St. Louis, in the county of St. Louis City and State of Missouri, have invented new and useful Improvements in Beet-Harvesters, of which the following is a specification.

This invention relates to beet harvesters and it consists in the novel features hereinafter described and claimed.

An object of the invention is to provide in a machine means for lifting the beets from the ground and depositing them upon spaced rods whereby they may gravitate into a receptacle provided for their reception. Various lever mechanisms and other means are provided for adjusting the several features of the invention in order that they may meet conditions under which they have to operate, and all of the working parts of the harvester are operated from the rear supporting ground wheels of the machine.

In the accompanying drawing:—

Figure 1 is a side elevation viewing the machine at one side thereof.

Fig. 2 is a similar view viewing the machine at the opposite side.

Fig. 3 is a top plan view of the harvester.

The beet harvester includes a frame 1 which is mounted at its forward end upon trucks 2 in a usual manner. Draft appliances 3 are connected with the forward portion of the frame 1 to which draft animals may be hitched for the purpose of drawing the machine over the ground.

An axle 4 is journaled for rotation at the rear portion of the frame 1 and ground wheels 5 are mounted upon the end portions of the said axle. An operator's seat 6 is mounted upon the upper forward portion of the frame 1. A shaft 7 is turnably mounted at the intermediate portion of the frame 1 and is provided with a number of fixed longitudinally curved digging tines 8. Forwardly disposed arms 9 are attached to the end portions of the shaft 7 and shafts 10 are turnably mounted at the forward ends of the said arms 9. The said shafts 10 are screwthreaded at their upper portions and engage internal screw threads provided at the upper part of the frame 1. Sprocket wheels 11 are mounted at the upper ends of the shafts 10 and a sprocket chain 12 is trained around the said wheels 11 and one of the said wheels 11 is provided at its upper side with an eccentrically positioned handle 13 whereby the said sprocket wheel may be turned. It is apparent that by turning the sprocket wheel which carries the handle 13 the chain 12 will cause both of the sprocket wheels and the shafts 10 to rotate in unison consequently the forward portions of the arms 9 may be raised or lowered and the tines 8 may be positioned to operate at a desired distance below the surface of the soil or may be positioned with their forward ends entirely above the upper surface of the soil. A shaft 14 is journaled for rotation at the upper intermediate portion of the frame 1 and a sprocket wheel 15 is fixed to one end of the shaft 14. A sprocket wheel 16 is journaled upon the shaft 7 for free rotation and a sprocket chain 17 is trained around the sprocket wheels 15 and 16. A gear wheel 18 is slidably mounted upon the shaft 7 and is fixed with relation to the sprocket 16. A suitable lever mechanism 19 is provided for moving the gear wheel 18 along the shaft 7. A gear wheel 20 is fixed to the axle 4 and the gear wheel 18 may be moved into and out of engagement with the said gear wheel 20. The shaft 14 carries a number of longitudinally curved tines 21 which are adapted to move through the spaces between the tines 8 when the shaft 14 rotates. Bars 22 loosely receive at their forward ends the shaft 14 and the rear ends of the said bars 22 are attached to the rear portion of the frame 1. When the shaft 14 is rotated the tines 21 carried thereby are adapted to move through the spaces between the bars 22. The bars 22 are rearwardly and downwardly inclined. Fenders 23, preferably of sheet metal, are attached to the frame 1 and are located at the opposite sides of the sets of tines and the bars 22 hereinbefore described. A hopper 24 is carried at the rear portion of the frame 1 with its upper edge below the delivery ends of the bars 22.

When the wheel 18 is in mesh with the teeth of the wheel 20 and the machine is drawn over the surface of the ground the axle 4 rotates and through the wheel 20 and wheel 18 rotary movement is transmitted to the wheel 16 which through the chain 17 rotates the shaft 14. As the machine moves along a row of plants the tines 8 cut into the soil below the beet while the tines 21 are rotating about the axis of the shaft 14. As the tines 8 encounter the beets they tend to lift the same from the soil and the tines 21 moving through the spaces between the tines 8 encounter the said beets and lift them from the soil and bring them in an upward and forward direction and deposit them upon the upper forward portions of the bars 22. From the bars 22 the beets gravitate down and fall into the hopper 24. When a sufficient quantity of beets has been collected in the hopper 24 they may be deposited in a pile upon the surface of the ground. During the movement of the beets by the tines and while they are passing over the bars 22 any small particles of earth which may tend to follow the beets will sift through the spaces between the tines and bars and fall to the surface of the ground so that the beets when they enter the hopper 24 are comparatively free from soil and other foreign matter.

Having described the invention what is claimed is:—

A harvester comprising a wheel mounted frame, a series of digging tines movably mounted thereupon, forwardly disposed arms connected with the support which carries the said digging tines, shafts connected with the said arms and having screw threading engagement with the frame, means for turning the said shafts simultaneously to raise or lower the digging tines, a shaft journaled upon the frame, means for rotating the shaft from the supporting wheels of the frame, and lifting tines mounted upon the shaft and adapted to move through the spaces between the digging tines when the said shaft rotates.

In testimony whereof I affix my signature in presence of two witnesses.

THOMAS M. FULBRIGHT.

Witnesses:
 PETER J. PATZEN,
 PATRICK J. ROHAN.

Copies of this patent may be obtained for five cents each, by addressing the "Commissioner of Patents, Washington, D. C."